United States Patent
Wu et al.

(10) Patent No.: US 8,125,582 B2
(45) Date of Patent: Feb. 28, 2012

(54) THREE-DIMENSIONAL IMAGE DISPLAY APPARATUS

(75) Inventors: Chou-Lin Wu, Taipei County (TW); Wei-Liang Hsu, Taipei (TW); Chao-Hsu Tsai, Hsinchu (TW); Chang-Shuo Wu, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 398 days.

(21) Appl. No.: 12/469,687

(22) Filed: May 21, 2009

(65) Prior Publication Data

US 2010/0091205 A1    Apr. 15, 2010

(30) Foreign Application Priority Data

Oct. 13, 2008    (TW) ................................ 97139194 A

(51) Int. Cl.
*G02F 1/1335* (2006.01)
*G02F 1/13* (2006.01)
(52) U.S. Cl. ............................................. 349/15; 349/1
(58) Field of Classification Search ................... 349/15
See application file for complete search history.

(56) References Cited

U.S. PATENT DOCUMENTS

| | | | | |
|---|---|---|---|---|
| 5,831,765 A * | 11/1998 | Nakayama et al. | ............ | 359/464 |
| 6,498,679 B2 * | 12/2002 | Lee et al. | ................. | 359/489.11 |
| 7,116,387 B2 * | 10/2006 | Tsai et al. | ...................... | 349/117 |
| 7,468,838 B2 * | 12/2008 | Cha et al. | ....................... | 359/465 |
| 7,567,307 B2 * | 7/2009 | Kim et al. | ........................ | 349/15 |
| 7,920,216 B2 * | 4/2011 | Hsu et al. | ........................ | 349/15 |
| 2007/0165145 A1 * | 7/2007 | Sugiyama | ........................ | 349/15 |
| 2008/0165296 A1 * | 7/2008 | Kim et al. | ........................ | 349/15 |
| 2008/0316597 A1 * | 12/2008 | Tsai et al. | ..................... | 359/465 |
| 2009/0167968 A1 * | 7/2009 | Hsu et al. | ........................ | 349/15 |

FOREIGN PATENT DOCUMENTS

| | | |
|---|---|---|
| CN | 1685277 | 10/2005 |
| CN | 101271199 | 9/2008 |

OTHER PUBLICATIONS

"First Office Action of China Counterpart Application", issued on Apr. 8, 2011, p. 1-p. 8.

* cited by examiner

*Primary Examiner* — Rhonda Peace
(74) *Attorney, Agent, or Firm* — Jianq Chyun IP Office

(57) ABSTRACT

A three-dimensional image display device including a polarized light module, a non-vertical polarized light barrier grating unit and an image display unit is provided. The polarized light module provides a polarized light. The non-vertical polarized light barrier grating unit is disposed in a light path of the polarized light to modulate the polarized light into a modulated polarized light in interlaced lines for output. The image display unit receives the modulated polarized light from the non-vertical polarized light barrier grating unit, and outputs two or more images with parallax.

24 Claims, 16 Drawing Sheets

THREE-DIMENSIONAL IMAGE DISPLAY APPARATUS

CROSS-REFERENCE TO RELATED APPLICATION

This application claims the priority benefit of Taiwan application serial no. 97139194, filed on Oct. 13, 2008. The entirety of the above-mentioned patent application is hereby incorporated by reference herein and made a part of this specification.

BACKGROUND

1. Technical Field

The present disclosure relates to an image display technique. More particularly, the present disclosure relates to a three-dimensional image display technique.

2. Description of Related Art

According to a conventional three-dimensional image display technique, the three-dimensional image display can be achieved with utilization of a barrier. The barriers are mainly grouped into three types, i.e. energy barriers, polarized light barriers and color barriers. The conventional barrier-type three-dimensional display device mainly applies the energy barrier, and a structure thereof is shown as FIG. 1. FIG. 1 is a schematic diagram illustrating a conventional mechanism of displaying three-dimensional images by using an energy barrier. Referring to FIG. 1, a backlight plate 100 provides a light source to a parallax barrier 101. The parallax barrier 101 has transparent and opaque interlaced vertical stripes for outputting light in interlaced stripes, and in coordination with pixels within a transmissive display unit 102 and a position of human eyes, a first eye of an observer can observe a first image, and a second eye can observe a second image. Therefore, the left eye and the right eye may sense an image separation effect, and a parallax is formed there between. According to a visual characteristic, a three-dimensional image can be generated according to such parallax, which is a basic mechanism for the three-dimensional display technique. As shown in FIG. 1, based on a function of the parallax barrier 101, the left eye can only observe the pixels in odd columns 01, 03, 05, 07 and 09, and cannot observe the pixels in even columns; meanwhile, the right eye can only observe the pixels in the even columns 02, 04, 06, 08 and 10, and cannot observe the pixels in the odd columns. The pixels in the odd columns and the pixels in the even columns are in allusion to a same target image, but there is a parallax there between. The two images form the three-dimensional image in a human vision system. According to such method, a X-direction resolution is decreased for a half, wherein the X-direction can also be referred to as a horizontal direction. According to such method, switching between 2D and 3D display modes cannot be achieved, and disposing angles of a screen is limited, which can only be a vertical stripe parallax barrier.

The structure of FIG. 1 can be varied. FIG. 2 is a schematic diagram illustrating another conventional mechanism of displaying three-dimensional images by using an energy barrier. Referring FIG. 2, similar to FIG. 1, the structure of FIG. 2 also applies the vertical stripes, and a difference between FIG. 1 and FIG. 2 is that positions of the parallax barrier 101 and the transmissive display unit 102 are exchanged. In other words, in FIG. 1, the transmissive display unit 102 is disposed at a same side of the backlight plate 100 and the parallax barrier 101, and in FIG. 2, the transmissive display unit 102 is disposed between the backlight plate 100 and the parallax barrier 101. The display effect of FIG. 2 is similar as that of FIG. 1, and the X-direction resolution is also decreased for a half, and switching between the 2D and 3D display modes cannot be achieved, and the disposing angle of the screen is limited, which can only be the vertical stripe parallax barrier.

In other words, the three-dimensional display technique is still under development.

SUMMARY

The present disclosure provides a three-dimensional image display device including a polarized light module, a non-vertical polarized light barrier grating unit, and an image display unit. The polarized light module provides a polarized light. The non-vertical polarized light barrier grating unit is disposed in a light path of the polarized light to modulate the polarized light into a modulated polarized light in interlaced lines for outputting. The image display unit receives the modulated polarized light from the non-vertical polarized light barrier grating unit, and outputs two or more images with parallax.

The present disclosure provides a dual-mode image display device including a polarized light module, a display unit and a non-vertical polarized light barrier grating unit. The polarized light module provides a polarized light. The display unit is used for displaying a 2D or a 3D image. The non-vertical polarized light barrier grating unit is disposed between the polarized light module and the display unit, and includes a control device, which is used for providing a first state corresponding to the 3D image or a second state corresponding to the 2D image according to a modulation control.

The present disclosure provides a dual-mode image display device including a polarized light module, an even phase retardation unit, a control device, a non-vertical micro phase retardation unit and a display unit. The polarized light module provides a polarized light. The even phase retardation unit has a first optical axis direction and a first phase retardation amount. The control device is controlled to present a non-modulated state or a modulated state. The micro phase retardation unit has a first region and a second region, wherein when the control device is in a first state according to a controlled modulated state, the first region and the second region form a polarized light barrier parallax grating. When the control device is in a second state, the first region and the second region do not form the polarized light barrier parallax grating. The optical axis direction of the even phase retardation unit is vertical to an optical axis direction of one of the two regions. The display unit displays a 2D or 3D image, wherein the even phase retardation unit, the control device and the micro phase retardation unit are disposed between the polarized light module and the display unit.

In order to make the aforementioned and other features of the present disclosure comprehensible, exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate exemplary embodiments and, together with the description, serve to explain the principles of the invention.

DETAILED DESCRIPTION

In a three-dimensional image display device such as a polarized light barrier three-dimensional display device, a polarized light barrier grating unit formed by a polarized light modulation unit, a non-vertical micro phase retardation unit and a polarizing film is disposed between a polarized light module and an image display unit. Image display of two or more viewing zones can be formed based on a phase distribution of the non-vertical micro phase retardation unit and distributed pixels of the image display unit, so that a left eye and a right eye of an observer can respectively observe images of two viewing zones, and accordingly the observer may sense a three-dimensional vision effect. In the multi viewing zone system, a display screen can be disposed and viewed in any angle (especially 0 degree and 90 degrees) based on rearrangement of images, and the resolution decreased in accordance with a requirement of the three-dimensional image display can be dispersed in a X direction and a Y direction, so as to resolve a problem of excessive sacrifice of a single-direction resolution within a general multi viewing zone system. By switching the polarized light modulation unit of the polarized light barrier grating unit between a modulated state and a non-modulated state, the displayed image can be switched between a planar image mode and a three-dimensional image mode. If such switching is not required, the polarized light modulation unit can also not be applied, so that the display unit can only present the three-dimensional image mode.

Figure 1:
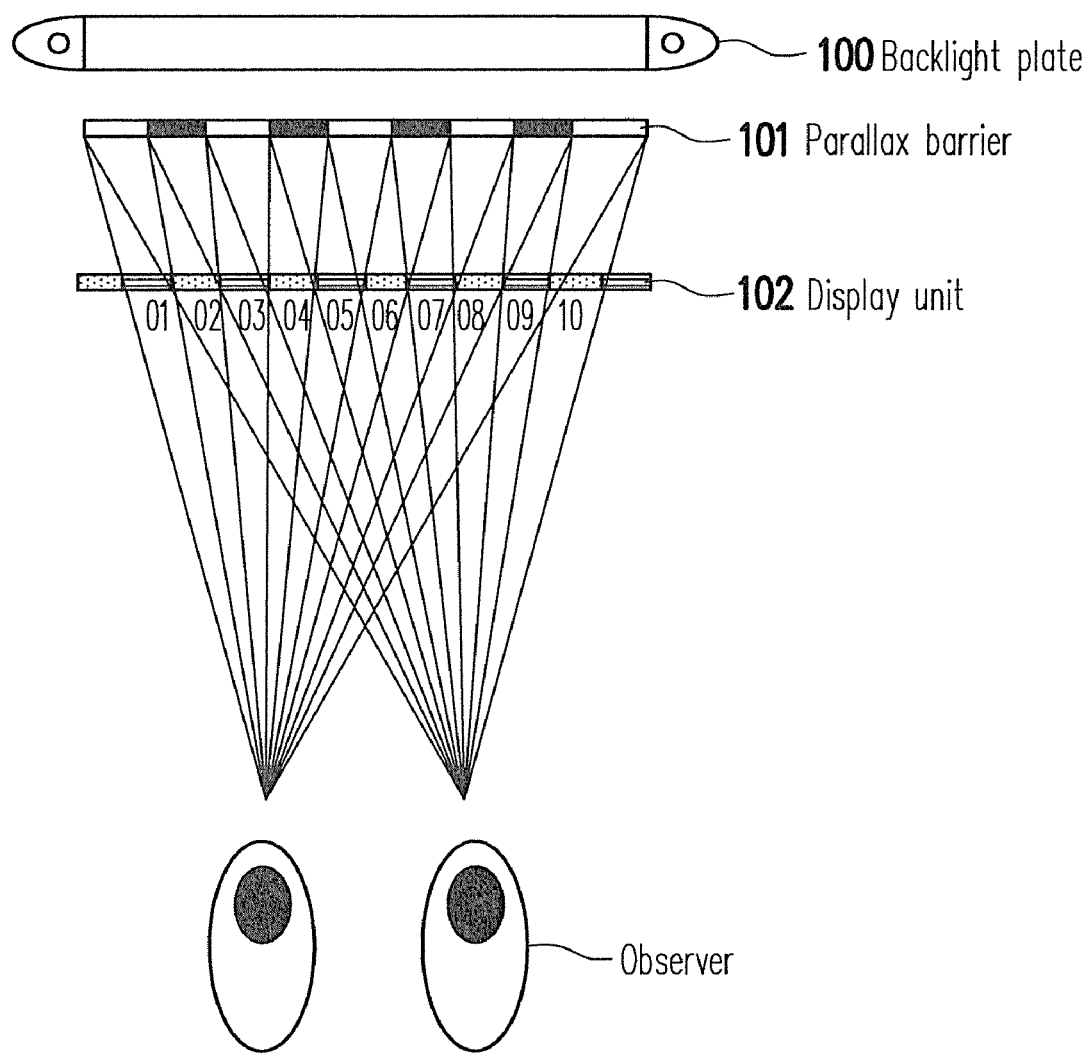
FIG. 1 is a schematic diagram illustrating a conventional mechanism of displaying three-dimensional images by using an energy barrier.
Figure 2:
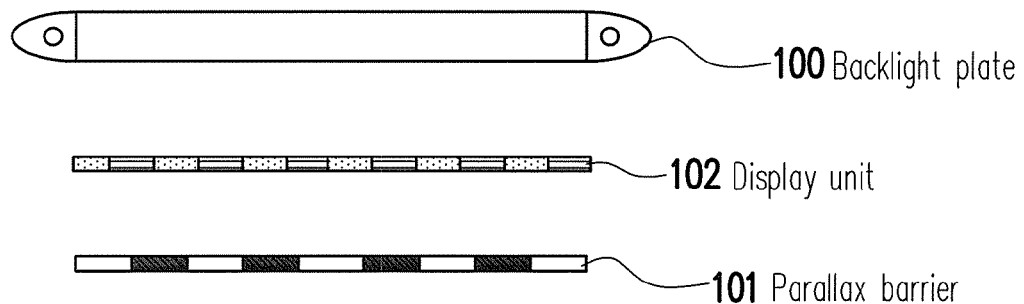
FIG. 2 is a schematic diagram illustrating another conventional mechanism of displaying three-dimensional images by using an energy barrier.
Figure 3:
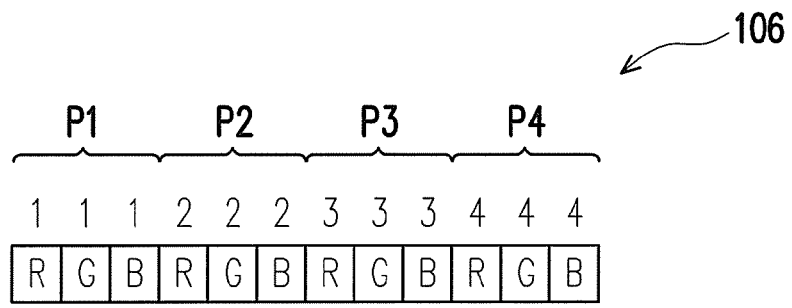
FIG. 3 is a schematic diagram illustrating a relation between pixels and viewing zones according to an exemplary embodiment.
Figure 4:
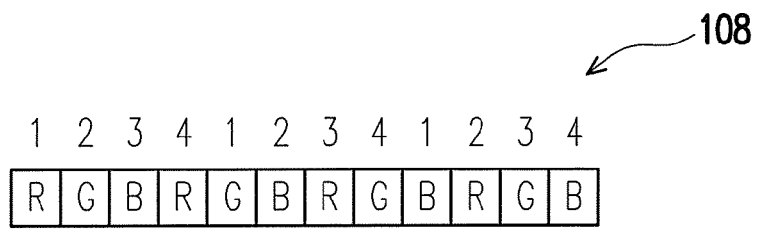
FIG. 4 is a schematic diagram illustrating another relation between pixels and viewing zones according to an exemplary embodiment.

First, related mechanisms of the present invention are described. FIG. 3 is a schematic diagram illustrating a relation between pixels and viewing zones according to an exemplary embodiment. Referring FIG. 3, generally, a color pixel is formed by three pixels of red (R), green (G) and blue (B). Taking an image of four viewing zones as an example, for a pixel 106, pixels P1, P2, P3 and P4 corresponding to the four viewing zones are required. Each of the pixels contains three sub-pixels, which can respectively display an R, G or B gray level. FIG. 3 illustrates a general distribution method of the pixels and the viewing zones, though a grating space thereof is relatively wide, so that the images of different viewing zones may have a problem of light leakage, and accordingly a color washout problem occurs, which can lead to a poor three-dimensional display effect. FIG. 4 is a schematic diagram illustrating another relation between pixels and viewing zones according to an exemplary embodiment. Referring to FIG. 4, according to another distribution method of the pixels and the viewing zones, for a pixel 108, each of the sub-pixels also displays the R, G or B gray level, though a displayed content thereof is in accordance with a viewing zone sequence. In other words, the front four sub-pixels for example, respectively display the RGBR gray levels belonged to the viewing zones 1, 2, 3 and 4. For the whole pixel 108, the color data to be displayed is still maintained, though the images of different viewing zones can be fairly separated. By such manner, the required grating resolution of the barrier is correspondingly increased, and therefore a better vision separation effect can be achieved.

Figure 5:
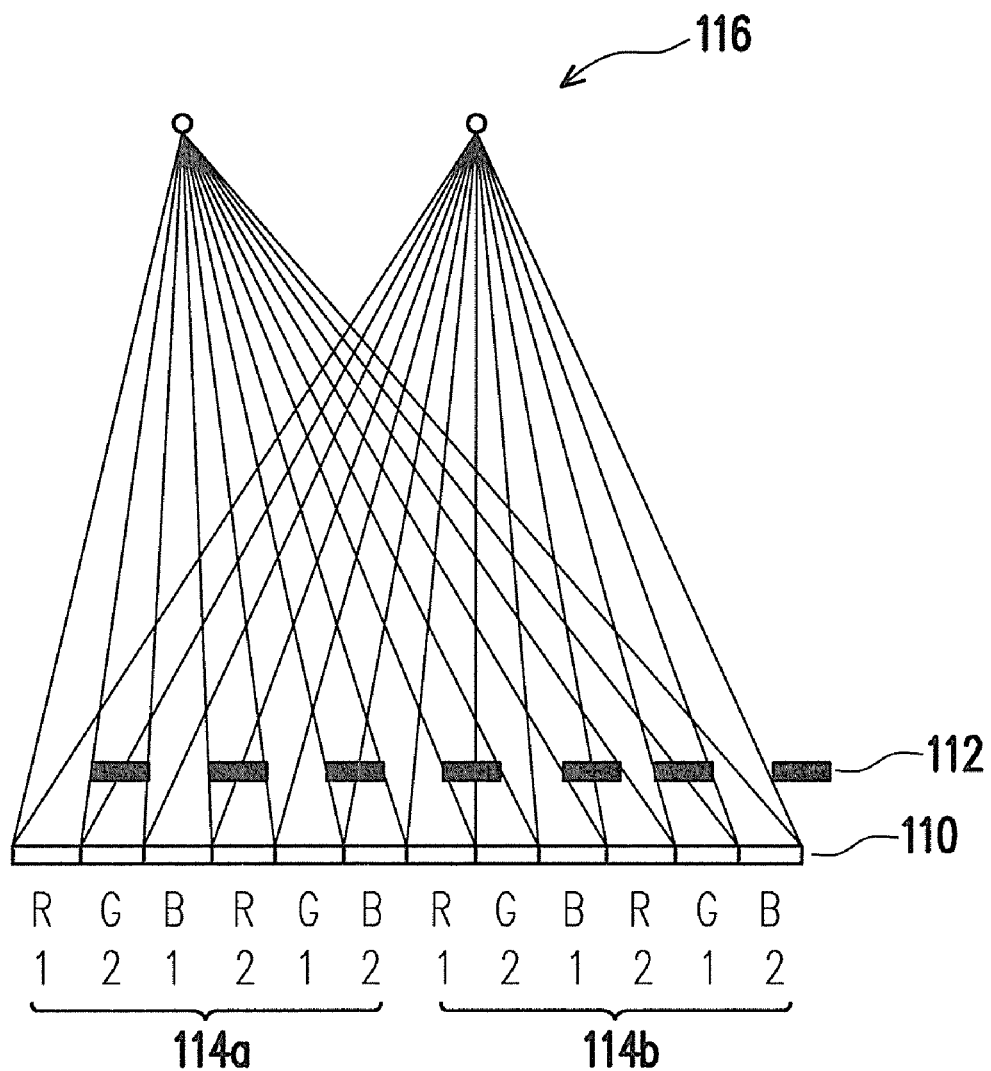
FIG. 5 is a schematic diagram illustrating a display mechanism according to an exemplary embodiment.

FIG. 5 is a schematic diagram illustrating a display mechanism according to an exemplary embodiment. Referring to FIG. 5, on a display unit 110, for example, two pixels 114a and 114b generate two viewing zones, and the grating resolution of an energy barrier 112 thereof is set according to sub-pixel resolutions. A black part of the energy barrier 112 can block all of the light, by which regardless of the polarized light or not, the light is blocked by the black parts of the energy barrier 112. Therefore, a part of the light is blocked by the energy barrier 112, and is dispersed to a left eye and a right eye of an observer 116, so that the observer 116 at another end of the light can observe a three-dimensional image.

Though according to the structure of FIG. 5, a display system thereof can only display a 3D image, and cannot display a 2D image. In the conventional technique, the straight line stripe structure vertically corresponding to the pixel positions is applied, so that during fabrication of the three-dimensional image system of two viewing zones, since the images are respectively provided to the left eye and the right eye, the horizontal resolution is sacrificed for a half. Moreover, in an observing system of two viewing zones, an observable range is relatively narrow, and if the observer slightly departs from an observing position, the observed image is not convergent, so that the observer cannot obviously feel the 3D image effect. Besides, the 3D image generated based on such method may limit a disposing approach of the screen. Namely, the screen can only disposed in a direction that the barrier can be vertical, and cannot be utilized when being rotated for 90 degrees.

Considering the above problems, in the present disclosure, a non-vertical pixel array is applied.

In the following content, exemplary embodiments are provided for describing the disclosure in detail, thought the present disclosure is not limited to the provided exemplary embodiments, and the provided exemplary embodiments can be mutually combined, suitably.

Figure 6:
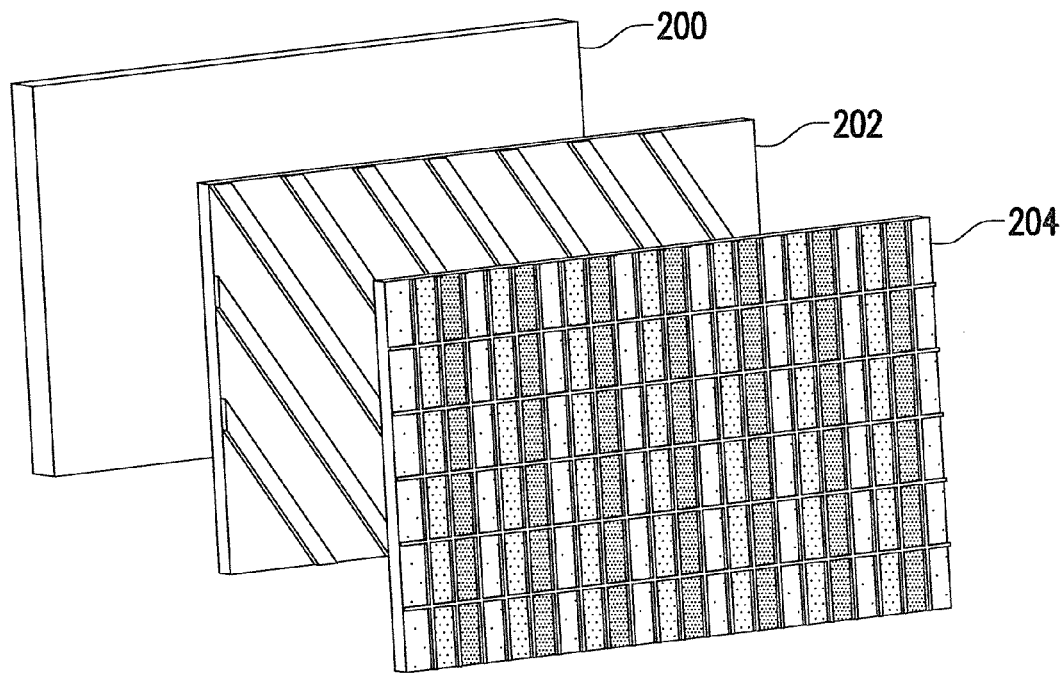
FIG. 6 is a perspective view of a three-dimensional display device containing a polarized light barrier grating unit according to an exemplary embodiment.
Figure 8:
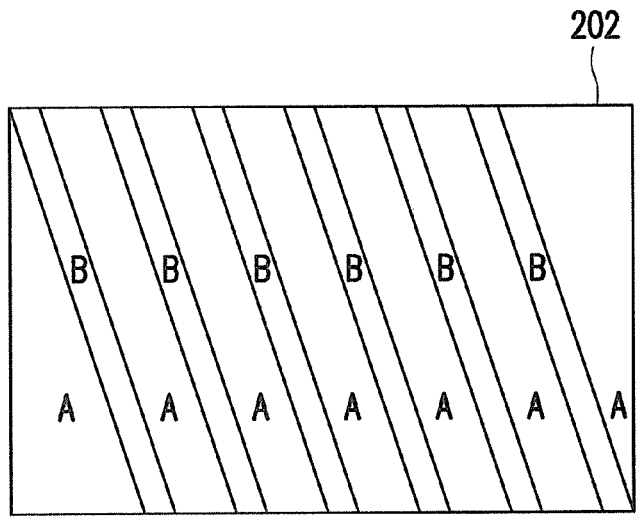
FIG. 8 is a schematic diagram illustrating a structure of a micro phase retardation unit according to an exemplary embodiment.

FIG. 6 is a perspective view of a three-dimensional display device containing a polarized light barrier grating unit according to an exemplary embodiment. Referring to FIG. 6, a display system of the present exemplary embodiment includes a polarized light module 200, a polarized light barrier grating unit 202 and a transmissive display unit 204. The polarized light barrier grating unit 202 containing a non-vertical micro phase retardation unit and polarizing film is disposed between the polarized light module 200 and the transmissive display unit 204. The polarized light module 200 provides a polarized light source with a predetermined polarization state to the polarized light barrier grating unit 202. Referring to FIG. 8 first, the micro phase retardation unit of the polarized light barrier grating unit 202 has non-vertical stripes formed by interlaced A-region retardant material and B-region retardant material, wherein the A-region retardant material and the B-region retardant material, for example, can respectively generate a $0\lambda$ retardation and a $\lambda/2$ retardation, so that the polarized light source can output the light in interlaced stripes via the non-vertical stripes in the micro phase retardation unit of the polarized light barrier grating unit 202.

In coordination of the stripe-type output light and the scattering pixel distribution of the transmissive display unit 204, the images are respectively projected to the left eye and the right eye of the observer. Since the micro phase retardation unit applies the non-vertical stripe design, decrease of the resolution caused by the polarized light barrier grating unit 202 can be averagely dispersed to a horizontal direction and a vertical direction, so as to avoid excessive decrease of the resolution in the unique horizontal direction. Therefore, an observable window and the image resolution can be simultaneously taken into consideration, and the three-dimensional image display of multi viewing zones can be achieved. Based on such method, by controlling the arrangement of the pixels of the displayed image, a rotation angle of the display can be 90 degrees, or the display can be disposed in any angle. The so-called rotation angle means that an image display plane is rotated for 90 degrees along a normal line direction, or is freely rotated for several predetermined angles according to design requirements, or is arbitrarily rotated within an allowed angle range, wherein the arrangement of the pixels is required to be correspondingly changed. In the following content, the exemplary embodiment is described in detail.

Figure 7:
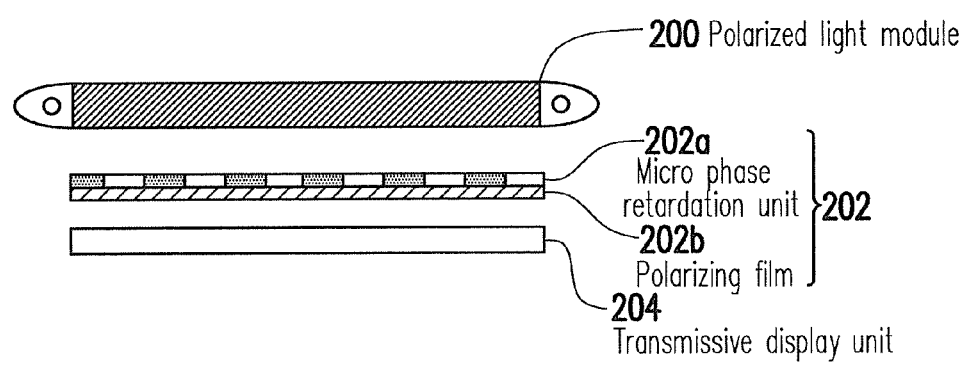
FIG. 7 is cross-sectional view of a three-dimensional image display device of FIG. 6 according to an exemplary embodiment.

FIG. 7 is cross-sectional view of a three-dimensional image display device of FIG. 6 according to an exemplary embodiment. Referring to FIG. 7, the polarized light barrier grating unit 202 for example, includes a micro phase retardation unit 202a and a polarizing film 202b. When a polarizing direction of the polarized light module 200 is the same to the direction of the polarizing film 202b, after the generated polarized light passes through the non-vertical stripe regions (shown as shadow regions) having the $\lambda/2$ retardation within the micro phase retardation unit 202a, the phase of the polarized light is rotated for 90 degrees, so that the polarized light cannot pass through the polarizing film 202b, and accordingly the opaque region is formed. Meanwhile, after the polarized light passes through the non-vertical stripe regions (shown as white regions) having the $0\lambda$ retardation, the phase of the polarized light is not changed and is maintained the same to the polarizing direction of the polarizing film 202b, so that the polarized light can pass through the polarizing film 202b, by which the transmissive region is formed. By such manner, the non-vertical interlaced stripe polarized light source is formed.

FIG. 8 is a schematic diagram illustrating a structure of a micro phase retardation unit according to an exemplary embodiment. Referring to FIG. 8, the micro phase retardation unit 202a applied to the polarized light barrier grating unit 202 of FIG. 7 has a plurality of interlaced stripe-type first regions A and a plurality of strip-type second regions B. The first regions A have an optical non-isotropic structure, so that the light passing there through may have the $\lambda/2$ retardation. In addition, the second regions B have an optical isotropic structure, so that the light passing there through does not have the retardation. Therefore, the first regions A and the second regions B have a $\lambda/2$ retardation difference. Certainly, the first regions A and the second regions B can also be exchanged, or as long as the $\lambda/2$ retardation difference is maintained there between, the retardations of the first regions A and the second regions B are not required to be specifically defined, and can be varied according to actual requirements. By suitably selecting the polarizing direction of the polarized light module 200 and the direction of the non-isotropic optical axis of the micro phase retardation unit 202a, the polarizing direction of the light passing through the first regions A is rotated for 90 degrees, which can be perpendicularly to the polarizing direction of the second regions B.

Figure 9:
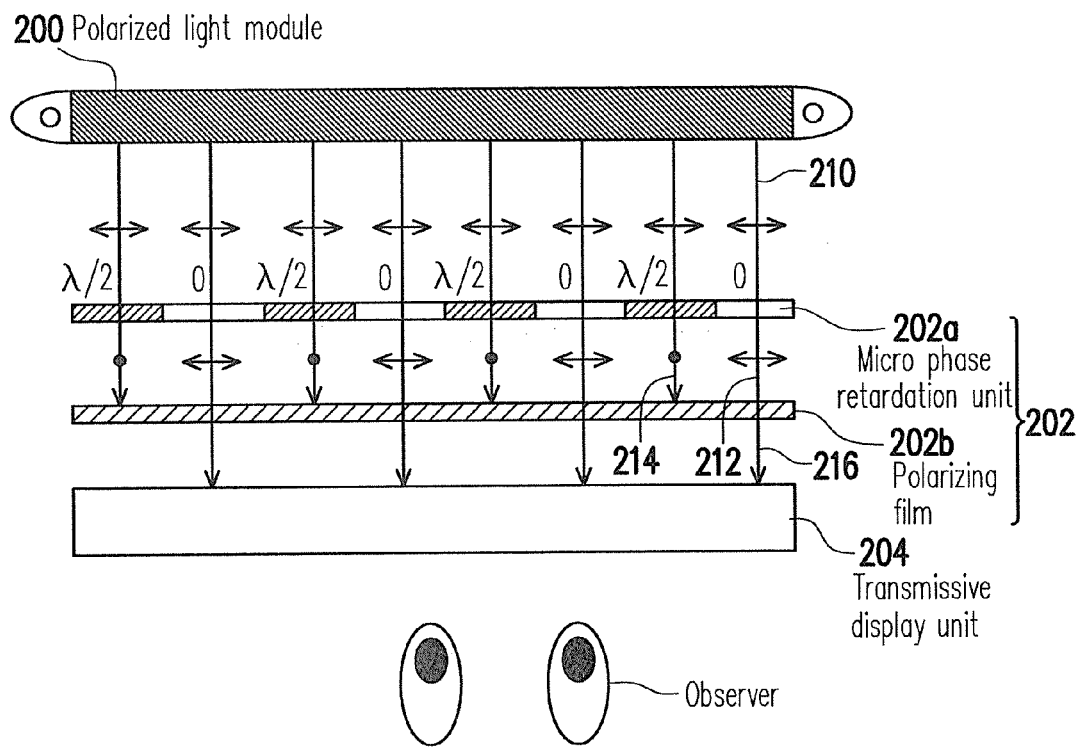
FIG. 9 is a schematic diagram illustrating a mechanism of a light path of a display device of FIG. 7 according to an exemplary embodiment.

FIG. 9 is a schematic diagram illustrating a mechanism of a light path of the display device of FIG. 7 according to an exemplary embodiment. If the polarized light 210 generated by the polarized light module 200 has the same polarizing direction (shown as the arrows) with that of the polarizing film 202b, and when the generated polarized light 210 passes through the non-vertical stripe regions having the $\lambda/2$ retardation within the micro phase retardation unit 202a, the phase of the polarized light 210 is rotated for 90 degrees to form a polarized light 214, which cannot pass through the polarizing film 202b, so that the opaque region is formed. Meanwhile, when the polarized light 210 passes through the non-vertical stripe regions having the $0\lambda$ retardation, since the phase of the polarized light 210 is maintained the same to the polarizing direction of the polarizing film 202b, the polarized light 210 can pass through the polarizing film 202b to form a transmissive light 212. Therefore, under the function of the micro phase retardation unit 202, the required interlaced output polarized light 216 can be obtained to serve as the light source for the three-dimensional image display.

Figure 10:
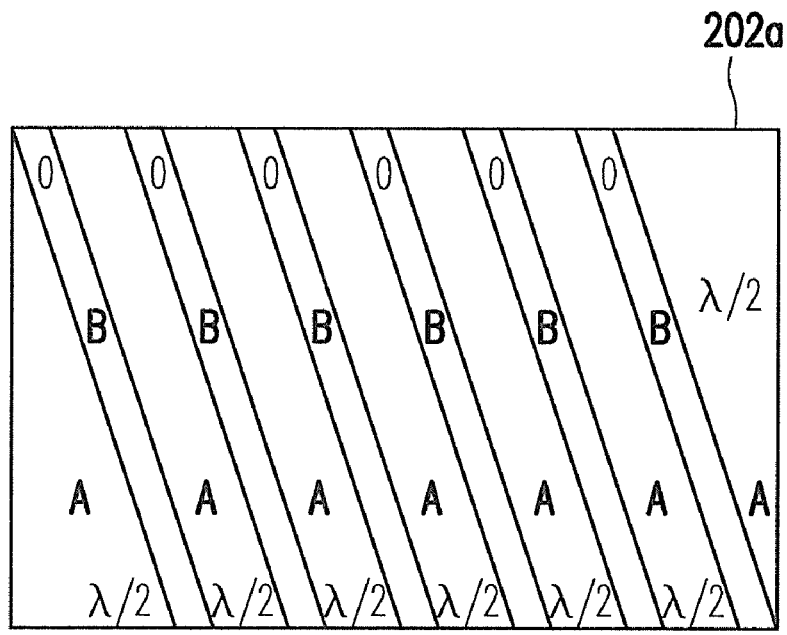
FIG. 10 is a schematic diagram illustrating a structure of a micro phase retardation unit 202a of FIG. 9.

FIG. 10 is a schematic diagram illustrating a structure of the micro phase retardation unit 202a of FIG. 9. Referring to FIG. 10, the micro phase retardation unit 202a, for example, has a plurality of interlaced stripe-type first regions A and a plurality of strip-type second regions B. Wherein, the first regions A have the optical non-isotropic structure to achieve the λ/2 retardation, and the second regions B have the optical isotropic structure, so that the first regions A and the second regions B have the λ/2 retardation difference. The first regions A and the second regions B can also be exchanged, or can be varied according to actual requirements. As described above, by suitably selecting the polarizing direction of the polarized light module 200 and the direction of the non-isotropic optical axis of the micro phase retardation unit 202a, the polarizing direction of the light passing through the first regions A is rotated for 90 degrees, which can be perpendicular to the polarizing direction of the second regions B.

After the polarized light 210 provided by the polarized light module 200 passes through the 0λ retardation and the λ/2 retardation non-vertical stripes of the micro phase retardation unit 202a, the polarized light 210 is divided into two polarized light 212 and 214 perpendicular to each other, so as to output the two polarized light 212 and 214 in interlaced stripes. Then, the two polarized light 212 and 214 are filtered by the polarizing film 202b to form the single polarized light 216, so that the transparent and opaque stripe-type non vertical light output is achieved. Now the grating unit 202 forms a polarized light barrier parallax grating, and in coordination with the images generated by the transmissive display unit 204, the observer then can observe the three-dimensional image.

A difference between the non-vertical micro phase retardation unit and the vertical micro phase retardation unit lies in the resolution. For the vertical micro phase retardation unit, the resolution is greatly decreased only in a single dimension (the horizontal direction). For example, for the vertical three-dimensional display device having four viewing zones, the resolution thereof in the horizontal direction is decreased to a quarter since all of the pixels thereof are required to be evenly distributed to the four different viewing zones, by which a whole image quality is greatly decreased, so that the horizontal resolution and the vertical resolution of the image is unbalanced. For three-dimensional display device applying the non-vertical micro phase retardation unit, when the three-dimensional display is disposed in the non-vertical direction, the sub-pixels therein are differently arranged in the horizontal direction and the vertical direction, so that the resolution is not only decreased in the single dimension, but is differently decreased according to different tilting angles and different arrangements of the sub-pixels. This is one of the advantages of the three-dimensional display device applying the non-vertical micro phase retardation unit. More importantly, the screen can be rotated for 90 degrees along a center normal line thereof based on such non-vertical distribution, and in coordination with redistribution of image input signals, the 3D image display effect can also be achieved.

Figure 11:
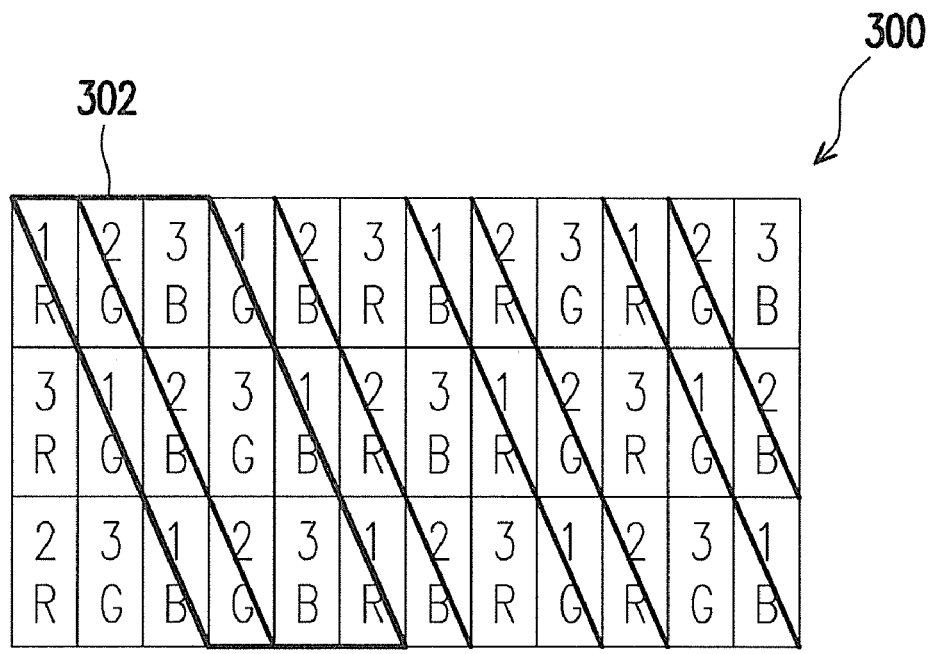
FIG. 11 is a schematic diagram illustrating a structure of pixel distribution according to an exemplary embodiment.

FIG. 11 is a schematic diagram illustrating a structure of pixel distribution according to an exemplary embodiment. Referring to FIG. 11, an analysis result of, for example, a three viewing zone system is presented in coordination with a three-dimensional display mechanism applying the non-vertical micro phase retardation unit. According to FIG. 11, the three red (R), green (G) and blue (B) sub-pixels marked as "1" in an image display unit 300 are all belonged to the first viewing zone. A structure of the micro phase retardation unit 302 is shown as FIG. 11. A pixel 302 having the three viewing zones includes two regions A and B, since positions of the sub-pixels of the pixel 302 on the image display unit 300 are the same relative to the non-vertical micro phase retardation unit. For the non-vertical micro phase retardation unit, the three sub-pixels can be projected to a same position in the space. Similarly, the sub-pixels marked as "2" and "3" are respectively belonged to the second viewing zone and the third viewing zone. Therefore, a main pixel formed by the RGB sub-pixels originally arranged along the horizontal direction is changed to be three obliquely arranged sub-pixels under the structure of the non-vertical micro phase retardation unit, so that in a whole vertical direction, a triple resolution is sacrificed. However, according to such arrangement of the sub-pixels, an original 1*3 planar display pixel is changed to a 1*1 three-dimensional display device with three viewing zones by the non-vertical phase retardation unit. If a number of the viewing zones is required to be increased, the space of the non-vertical phase retardation unit can be increased, so that more sub-pixels can be contained therein in the horizontal direction.

Figure 12:
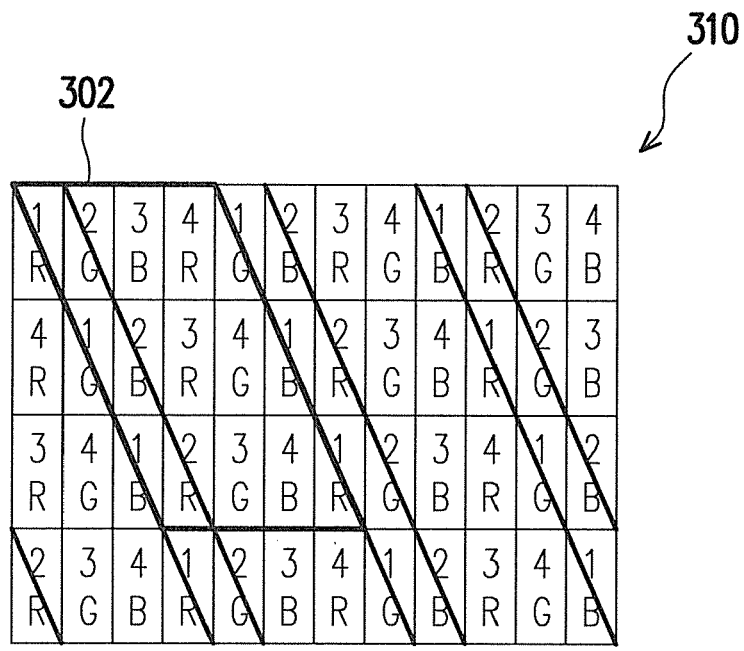
FIG. 12 is a schematic diagram illustrating a structure of pixel distribution according to an exemplary embodiment.

FIG. 12 is a schematic diagram illustrating a structure of pixel distribution according to an exemplary embodiment. Referring to FIG. 12, a sub-pixel distribution state of the image display unit 310 having four viewing zones is illustrated. In this case, arrangement of the sub-pixels is also changed from the horizontal direction to the vertical direction, so that the resolution in the vertical direction is sacrificed for triple, and in the horizontal direction, 4/3 pixels are changed to be 1 three-dimensional pixel. Namely, an original 4/3*3 planar display pixel is changed to a 1*1 three-dimensional display device with four viewing zones by the non-vertical phase retardation unit.

Figure 13:
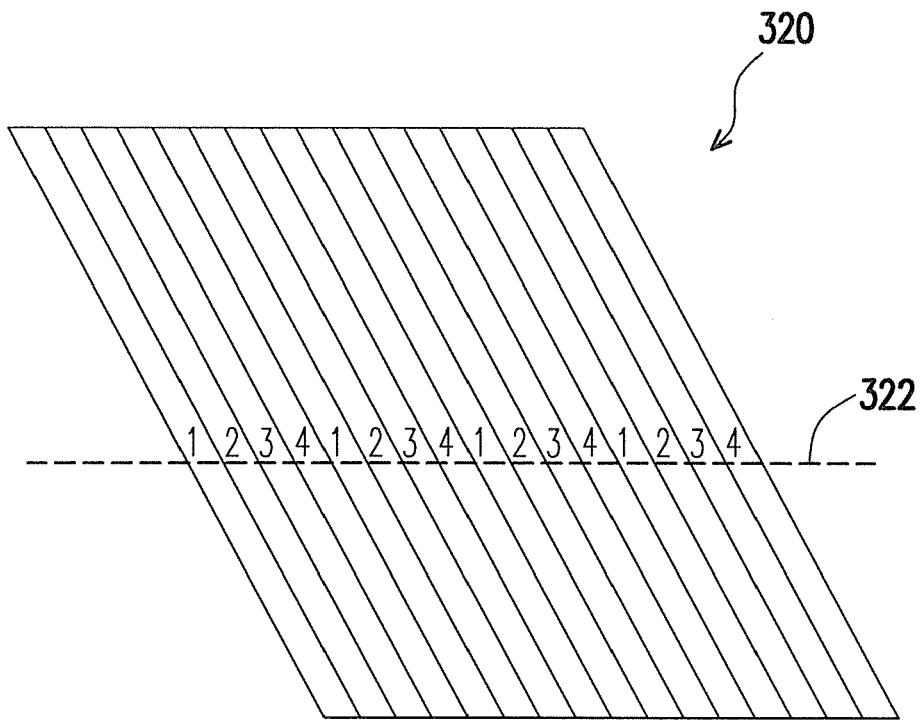
FIG. 13 is a schematic diagram illustrating a three-dimensional display mechanism according to an exemplary embodiment.

FIG. 13 is a schematic diagram illustrating a three-dimensional display mechanism according to an exemplary embodiment. In case of the aforementioned three-dimensional display with four viewing zones, a projected image of the three-dimensional display device 320 in the space is shown as FIG. 13. On an image scan line 322 of one direction, the numbers 1, 2, 3 and 4 thereof respectively represent the four different viewing zones, wherein as long as two of the viewing zones fall within a distance range of the two eyes, for example, 6.0 mm~7.0 mm, the three-dimensional display effect is then achieved via the parallax.

Figure 14:
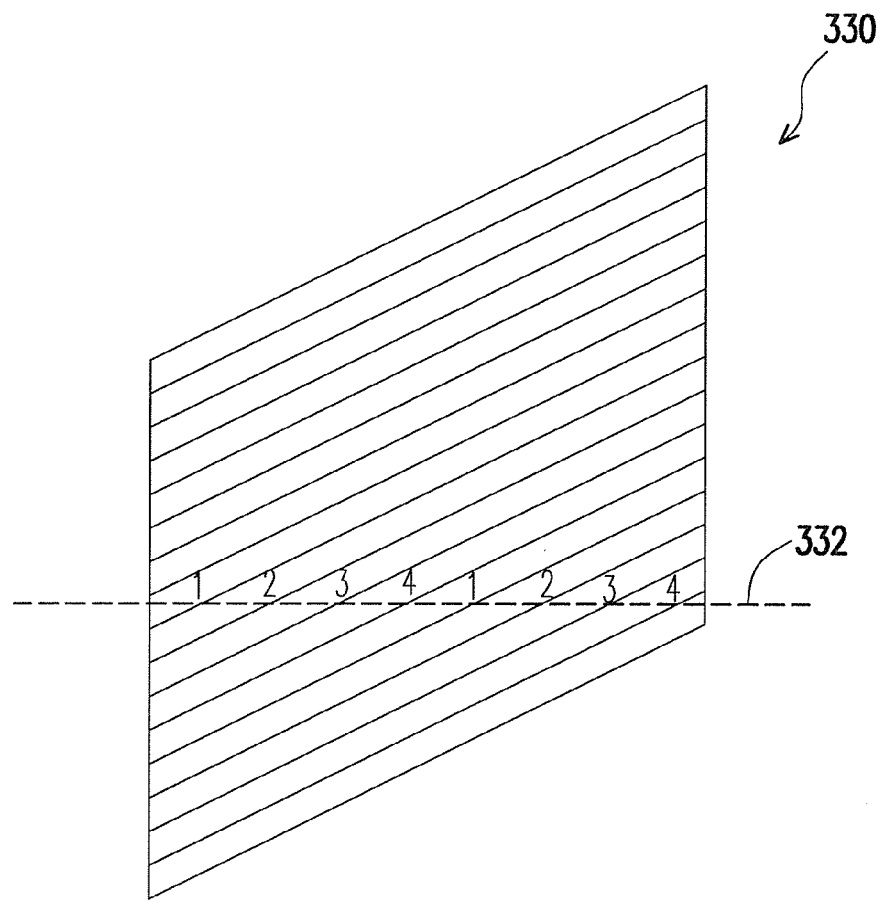
FIG. 14 is a schematic diagram illustrating a three-dimensional display mechanism in another direction according to an exemplary embodiment.

FIG. 14 is a schematic diagram illustrating a three-dimensional display mechanism in another direction according to an exemplary embodiment. If the screen of the three-dimensional display device 320 of FIG. 13 is rotated for 90 degrees along the center normal line, the three-dimensional image in the space which is generated according to the same structure is then shown as FIG. 14. The three-dimensional display device 330 can be achieved via the scan line 322 of another direction in coordination with rearrangement and output of the image pixels. Wherein, the numbers 1, 2, 3 and 4 respectively represent the four different viewing zones, wherein as long as two of the viewing zones fall within the distance range of the two eyes, for example, 6.0 mm~7.0 mm, the three-dimensional display effect is then achieved via the parallax.

According to the same design principle, a disposing angle of the screen can be arbitrarily adjusted, and in coordination with the rearrangement and output of the image pixels, the three-dimensional display effect can be achieved. In other words, the three-dimensional display effect can be achieved in multi display angles.

Figure 15:
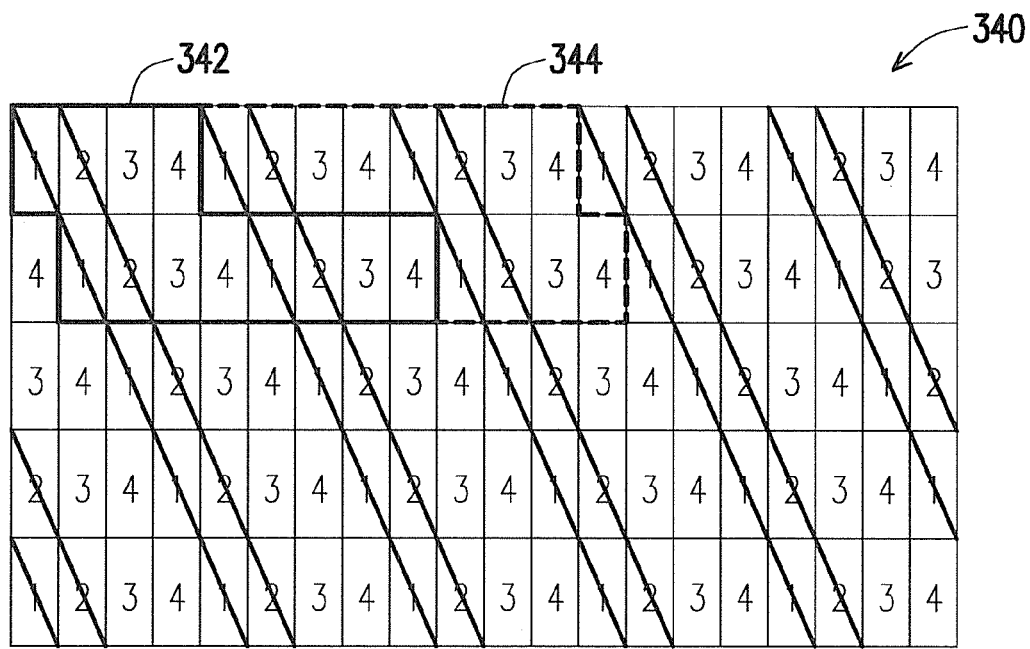
FIG. 15 is a schematic diagram illustrating a structure of pixel distribution according to an exemplary embodiment.

Moreover, in the three-dimensional display device with the four viewing zones that applies the non-vertical micro phase retardation unit, arrangement of the sub-pixels is actually diversified, and for the other arrangement of the sub-pixels, the resolution thereof is also differently varied. FIG. 15 is a schematic diagram illustrating a structure of pixel distribution according to an exemplary embodiment. Referring to FIG. 15, in an image display unit 340, the numbers 1, 2, 3 and 4 respectively represent a different viewing zone. In the viewing zones, when the RGB sub-pixels of the pixels 342 and 344 are selected, the selection is not limited to be performed within the back and forth, left and right adjacent positions, but can also be performed in different non-vertical micro phase retardation units. In this case, a 4*2 planar display pixel can be changed to a 2*1 three-dimensional display device with four viewing zones by the non-vertical micro phase retardation unit. Namely, according to such selection, a double resolution is sacrificed in the horizontal direction, and a double resolution is also sacrificed in the vertical direction. According to such sub-pixel selection method, the vertical direction is not limited to the triple resolution sacrifice, but can also have a selection of double resolution sacrifice.

According to the aforementioned pixel selection method, in the three-dimensional display system with four viewing zones, sacrifice of the resolution can be dispersed in the X direction and the Y direction, so as to achieve an even dispersion. The aforementioned selection methods are only examples, and the present invention is not limited thereto. Actually, other different pixel arrangements can also be applied. The same method can also be applied to the three-dimensional display system with multi viewing zones, so as to achieve the even dispersion.

Figure 16:
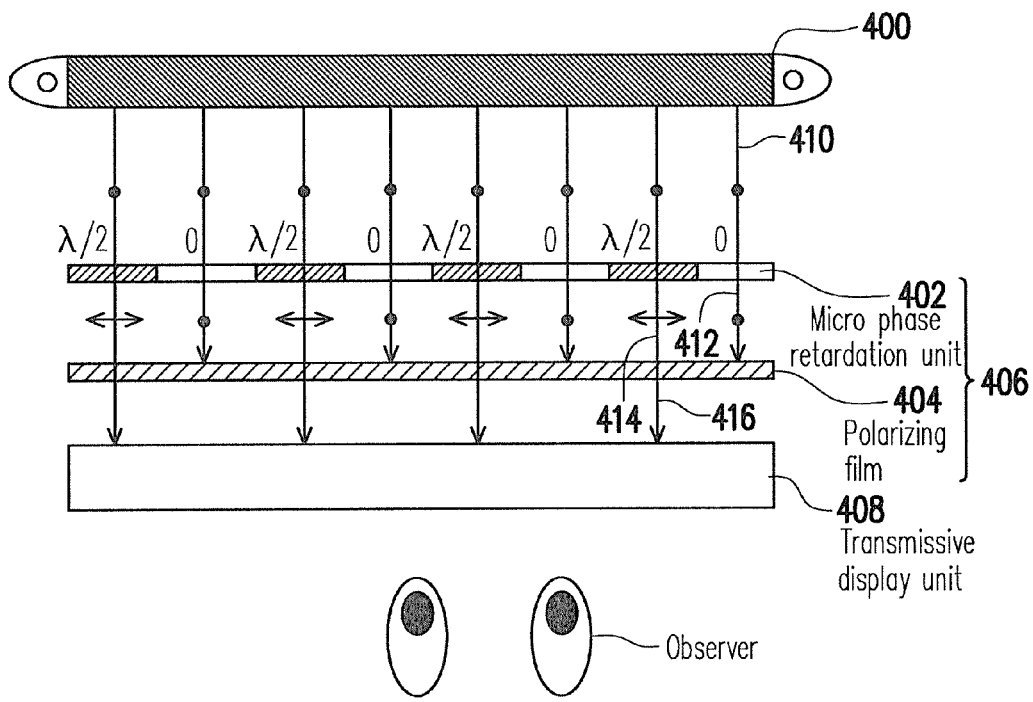
FIG. 16 is a schematic diagram illustrating another operation mechanism of a three-dimensional image mode according to an exemplary embodiment.

FIG. 16 is a schematic diagram illustrating another operation mechanism of the three-dimensional image mode according to an exemplary embodiment. When a polarizing direction of a polarized light 410 generated by a polarized light module 400 is perpendicular to a direction of a polarizing film 404, and when the generated polarized light 410 passes through the stripe regions having the 0λ retardation within a micro phase retardation unit 402 of a grating unit 406, the polarized light 410 cannot pass through the polarizing film 404, so that an opaque region is formed. Meanwhile, when the polarized light 410 passes through the stripe regions having the λ/2 retardation, the phase of a polarized light 414 is rotated for 90 degrees, so that the polarized light 414 can pass through the polarizing film 404 to form a polarized light 416 of the transmissive region, which can provide a light source for a transmissive display unit 408 to serve as the light source for the three-dimensional display.

Figure 17:
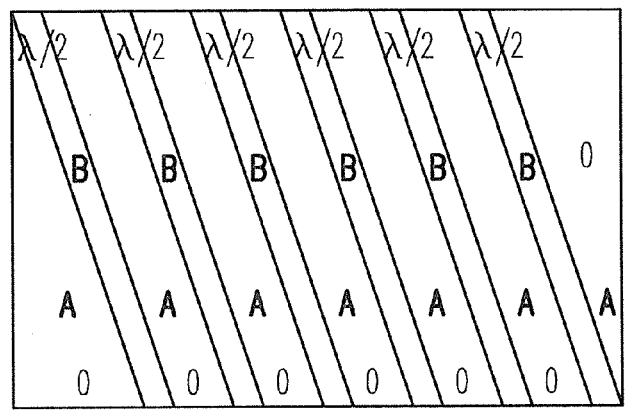
FIG. 17 is a schematic diagram illustrating a micro phase retardation unit 402 of FIG. 16 according to an exemplary embodiment.

FIG. 17 is a schematic diagram illustrating the micro phase retardation unit 402 of FIG. 16 according to an exemplary embodiment. Referring to FIG. 17, the micro phase retardation unit 402 has a plurality of interlaced strip-type first regions A and a plurality of the strip-type second regions B, which is for example, similar to that shown in FIG. 10, though the first regions A have the optical isotropic structure, and the second regions B have the optical non-isotropic structure to achieve the λ/2 retardation.

According to a design of FIG. 16 and the structure of FIG. 17, a display mechanism thereof is similar to that of FIG. 9, by which the three-dimensional display effect can also be achieved in multi display angles, and detailed description thereof is not repeated.

Figure 18:
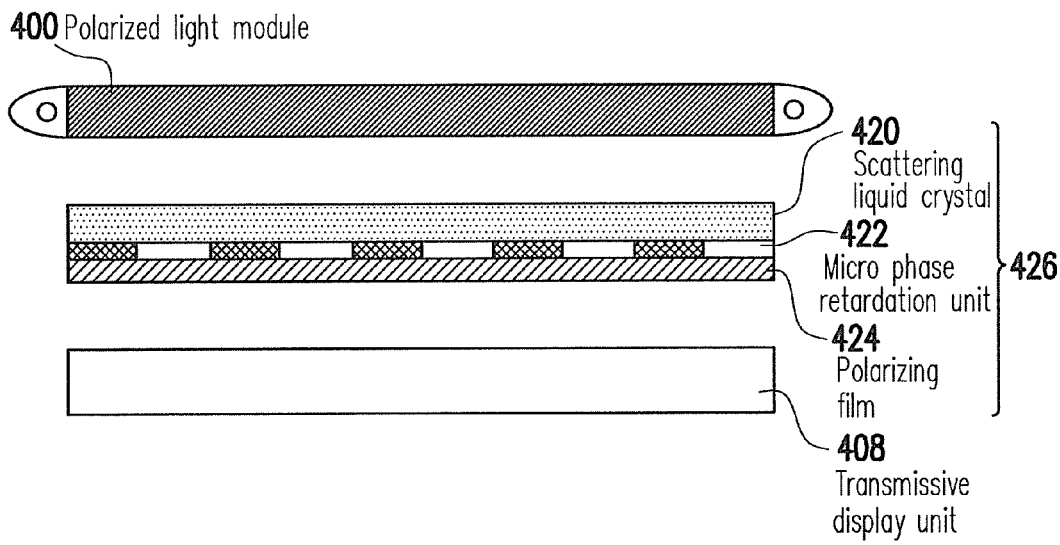
FIG. 18 is a cross-sectional view of a three-dimensional display device having a 2D/3D switching function according to another exemplary embodiment.

FIG. 18 is a cross-sectional view of a three-dimensional display device having a 2D/3D switching function according to another exemplary embodiment. Referring to FIG. 18, a polarized light barrier grating unit 426 of the present exemplary embodiment not only includes a micro phase retardation unit 422 and a polarizing film 424, but also includes a polarized light modulation unit, which can be a modulation unit applying scattering liquid crystal 420. A function of the modulation unit is that the polarized light generated by the polarized light module 400 can pass there through, or can be modulated into non-polarized light.

In detail, a polarized light barrier grating unit including the polarized light modulation unit, the non-vertical micro phase retardation unit and the polarizing film can be disposed between the polarized light module and the image display unit, wherein the polarized light modulation unit can be a controllable scattering liquid crystal unit or a controllable polarized light rotation liquid crystal unit. For the controllable scattering liquid crystal unit, the polarized light can be modulated between a scattering state (modulated state) and a clear state (non-modulated state), so as to switch the displayed imaged between the 2D mode and the 3D mode. On the other hand, for the controllable polarized light rotation liquid crystal unit, the polarized light can be modulated between a polarized rotation state (modulated state) and a non-polarized rotation state (non-modulated state), so as to switch the displayed imaged between the 2D mode and the 3D mode. Moreover, if one side of the polarized light barrier grating unit that faces the image display unit includes the polarizing film, the polarizing film within the polarized light barrier grating unit can be omitted. The non-vertical micro phase retardation unit in the polarized light barrier grating unit has the interlaced non-vertical stripes divided into regions A and regions B, so that the polarized light can be output in interlaced stripes after passing through the non-vertical stripes, and in coordination with the scattering pixel distribution, two or more images are respectively projected to a position in the space and enters the left eye and the right eye of the observer to form the three-dimensional image. A mechanism of 3D display thereof is still the same, though the 2D display can also be switched.

Figure 19:
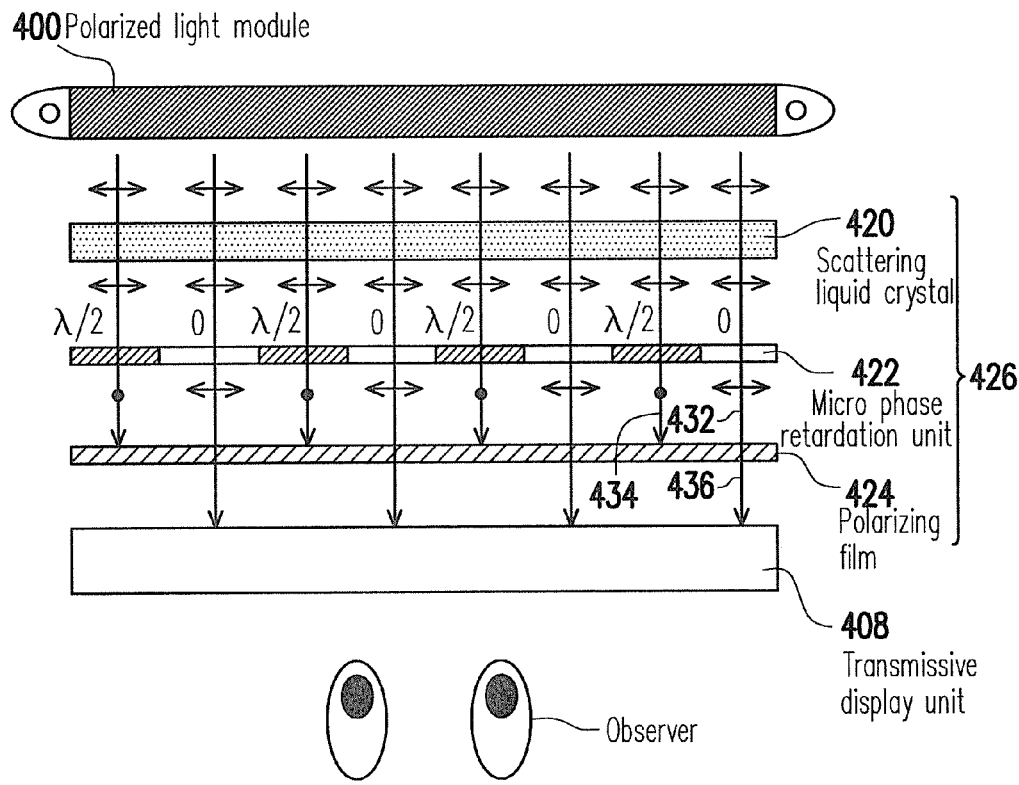
FIGS. 19-20 are schematic diagrams illustrating a 3D mode mechanism of a three-dimensional display device having a 2D/3D switching function according to other exemplary embodiments.
Figure 20:
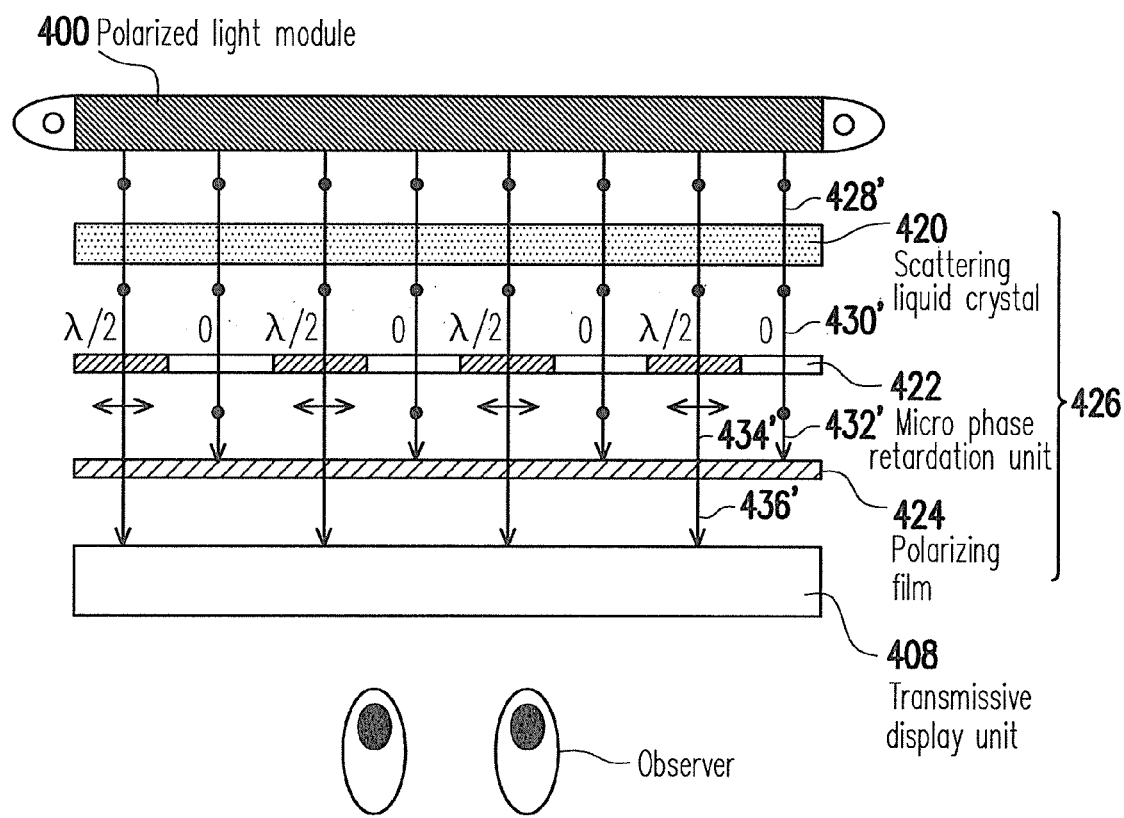

FIGS. 19-20 are schematic diagrams illustrating a 3D mode mechanism of a three-dimensional display device having the 2D/3D switching function according to other exemplary embodiments. Referring to FIG. 19, for the 3D mode operation, the controllable scattering liquid crystal unit 420 serves as a polarized light modulation unit for modulating a polarization of the polarized light passed there through. The controllable scattering liquid crystal unit 420 has the controllable clear state and the scattering state. When the controllable scattering liquid crystal unit 420 is switched to the clear state, the polarized light can pass there through with its original polarization. When the controllable scattering liquid crystal unit 420 is switched to the scattering state, the polarized light is scattered, and the original polarization thereof is lost, so that the polarized light is converted into non-polarized light.

When a polarizing direction of the polarized light module 400 is the same to the direction of the polarizing film 424, and if the controllable scattering liquid crystal unit 420 is switched to the clear state, the polarized light can pass there through with its original polarization, and the 3D image can be presented as described above. The polarization states of the polarized light 432 and 434 have a 90 degrees difference, so that only the polarized light 434 can pass through the polarizing film 424 to form the polarized light 436.

Referring to FIG. 20, in the present exemplary embodiment, the polarizing direction of the polarized light module 400 is opposite to the direction of the polarizing film 424, and the polarization states of the polarized light 432' and 434' also have the 90 degrees difference, so that only the polarized light 434' can pass through the polarizing film 424 to form the polarized light 436'.

Figure 21:
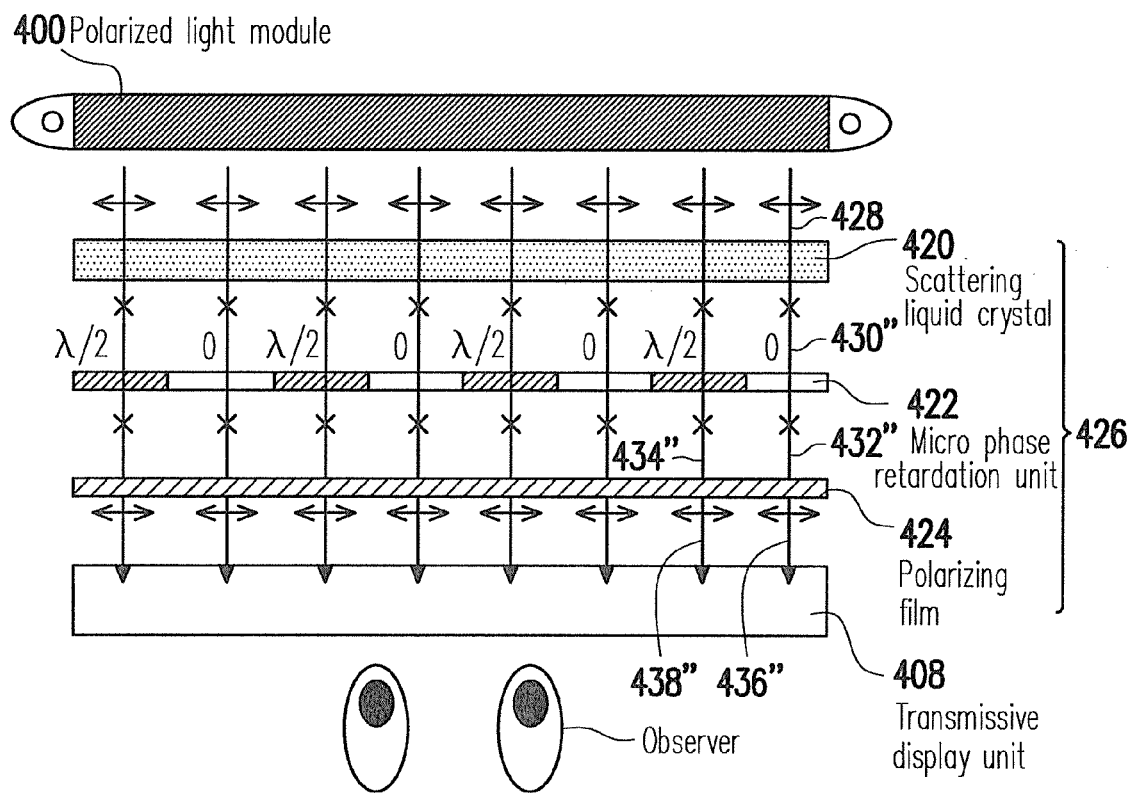
FIG. 21 is a schematic diagram illustrating a 2D mode mechanism of a three-dimensional display device having a 2D/3D switching function according to another exemplary embodiment.

FIG. 21 is a schematic diagram illustrating a 2D mode mechanism of a three-dimensional display device having the 2D/3D switching function according to another exemplary embodiment. In the planar or the 2D image mode, the same polarized light 428 generated by the polarized light module 400 enters the polarized light barrier grating unit 426. Now, by switching the controllable scattering liquid crystal 420 to the scattering state, the polarization state of the input polarized light is scattered, so as to form the non-polarized light 430". Under function of the micro phase retardation unit 422, such non-polarized light source does not have an effective optical function in overview. Therefore, the polarized light barrier grating unit 426 also does not form the parallax gratings. Next, the polarizing film 424 allows the single polarized light to pass there through, and after passing through the transmissive display unit 408, the single polarized light enters the eyes of the observer, so that the observer can observe the planar image effect.

Figure 22:
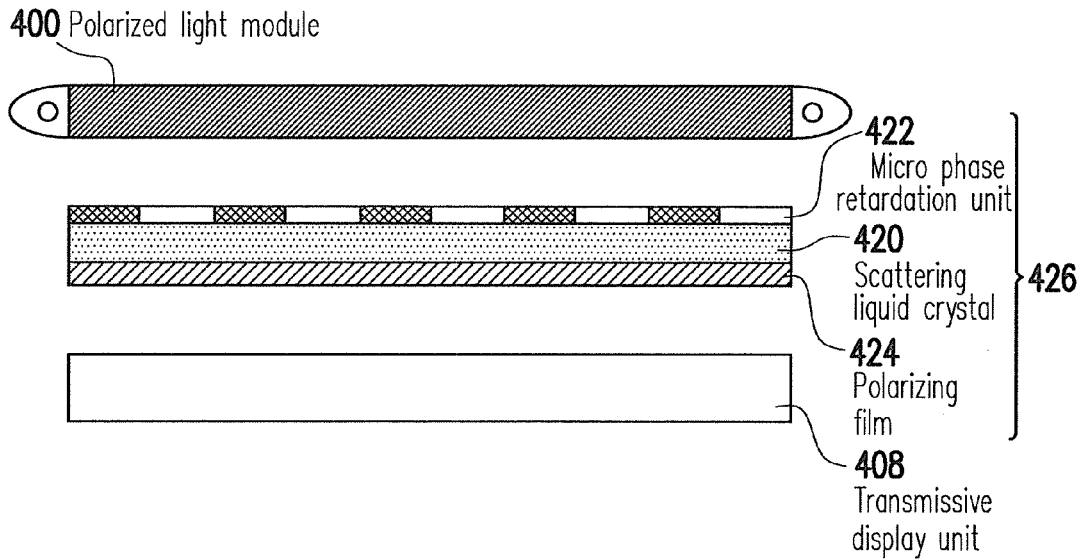
FIGS. 22-23 are schematic diagrams illustrating a three-dimensional image display device having a 2D/3D switching function according to other exemplary embodiments.
Figure 23:
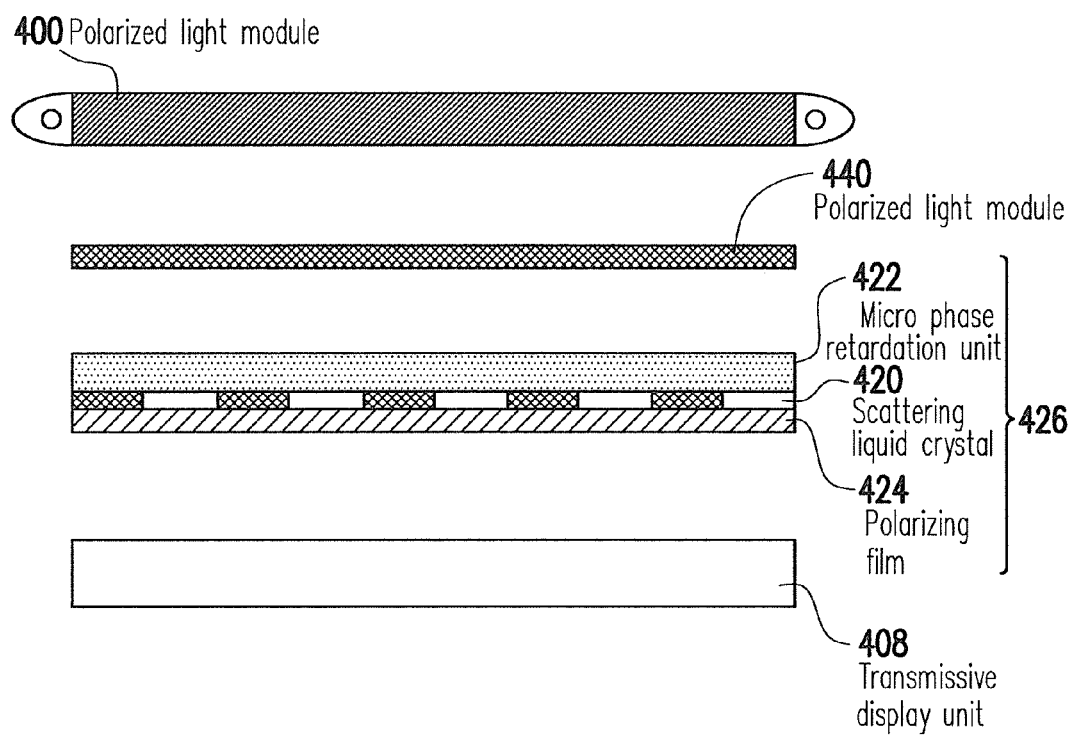

FIGS. 22-23 are schematic diagrams illustrating a three-dimensional image display device having the 2D/3D switching function according to other exemplary embodiments.

Referring to FIG. 22, positions of the scattering liquid crystal unit and the micro phase retardation unit in the polarized light barrier grating unit 426 can be exchanged, and the 2D/3D display effect can also be achieved.

Referring to FIG. 23, an even phase retardation unit 440 can be applied to such system structure, by which functions of the 2D/3D switching, disposing with 90 degrees rotation and display of two or more images can also be achieved. By using the even phase retardation unit 440 in coordination with the polarized light barrier grating unit 426, the light leakage can be prevented, so as to achieve a better grating effect.

Figure 24:
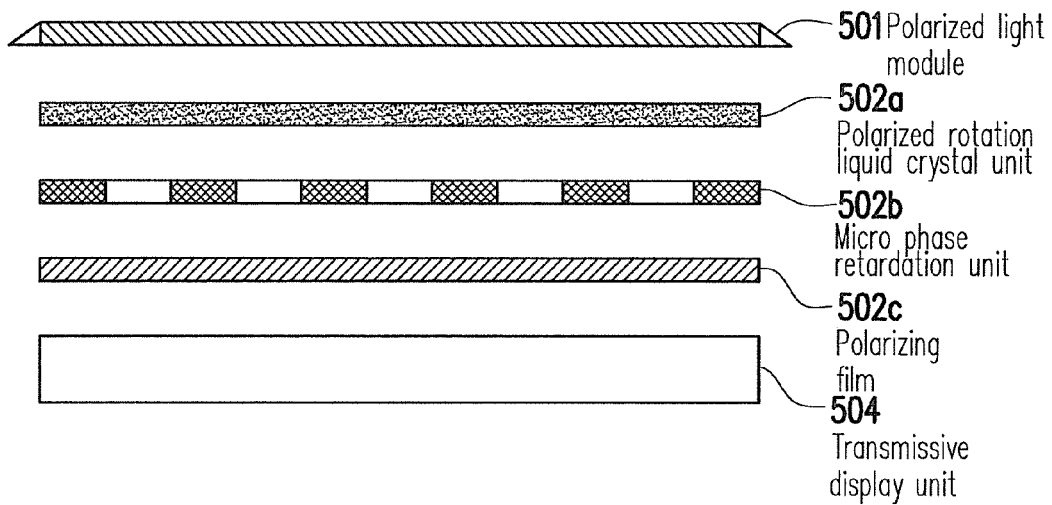
FIG. 24 is a schematic diagram illustrating a three-dimensional image display device having a 2D/3D switching function according to another exemplary embodiment.

FIG. 24 is a schematic diagram illustrating a three-dimensional image display device having the 2D/3D switching function according to another exemplary embodiment. Referring to FIG. 24, a variation of the 2D/3D image mode is described. In the present exemplary embodiment, the controllable polarized light rotation liquid crystal unit is used to substitute the controllable scattering liquid crystal 420. In the 3D mode, a polarized light module 501 provides the polarized light. The controllable polarized light rotation liquid crystal unit 502a serves as a polarized light modulation unit for modulating the polarization state of the polarized light passed there through. The controllable polarized light rotation liquid crystal unit 502a has the controllable non-polarized rotation state and the polarized rotation state. When the controllable polarized light rotation liquid crystal unit 502a is switched to the non-polarized rotation state, the polarized light can pass there through with its original polarization. When the controllable polarized light rotation liquid crystal unit 502a is switched to the polarized rotation state, the optical axis of the polarized light is rotated for 45 degrees or is directly converted into a circular polarized light. Under such state, the original polarized light may have three possible variations. The first one is a linear polarized light with 45 degrees rotation, or an elliptical polarized light with an optical axis thereof being rotated for 45 degrees relative to the original polarizing direction, and the other one is the circular polarized light. In case of the circular polarized light, there is no specific optical axis angle.

Figure 25:
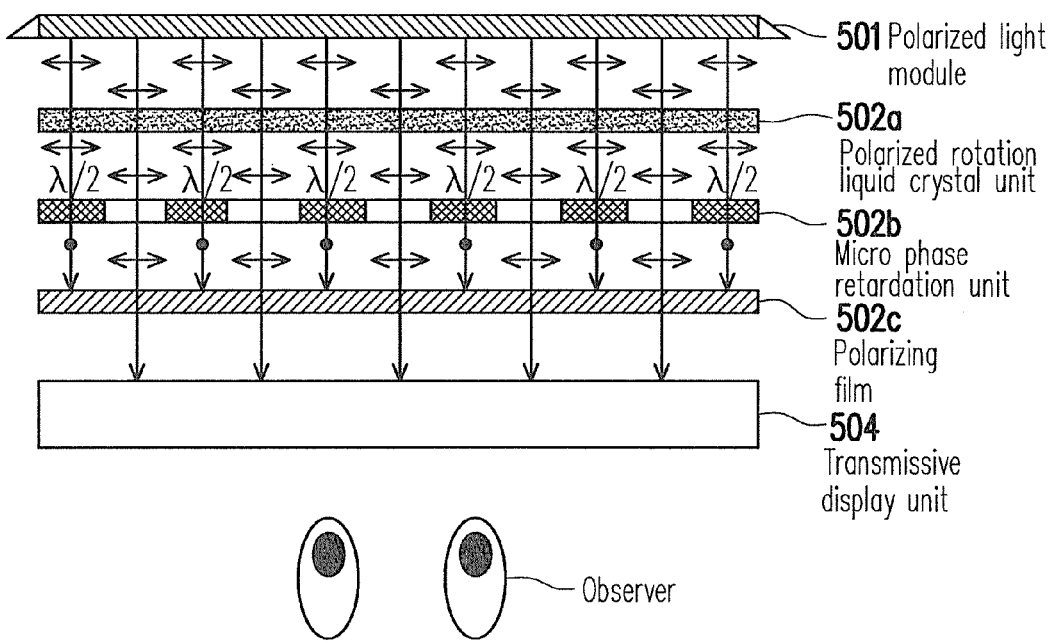
FIGS. 25-27 are schematic diagrams illustrating a grating mechanism according to an exemplary embodiment of FIG. 24.
Figure 26:
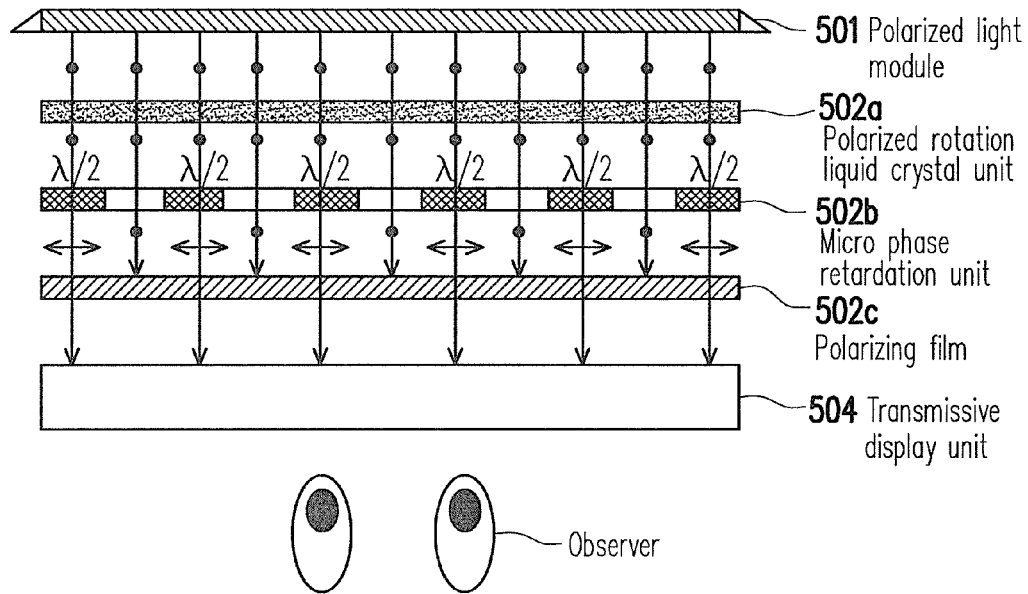
Figure 27:
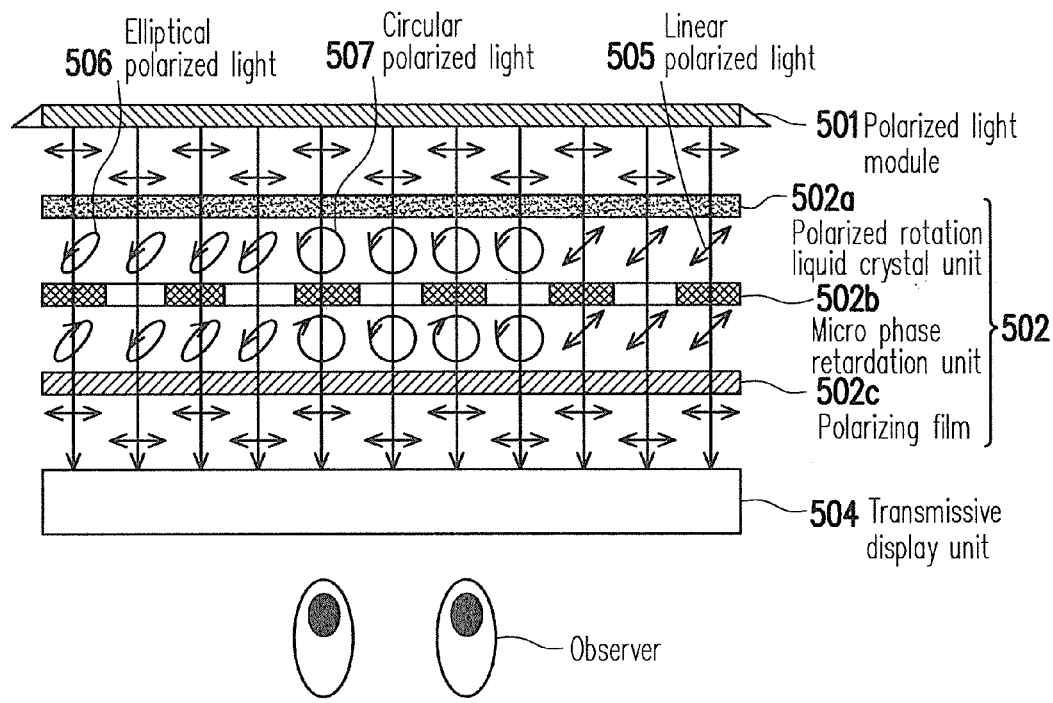

FIGS. 25-27 are schematic diagrams illustrating a grating mechanism according to the exemplary embodiment of FIG. 24. Referring to FIG. 25, when the polarizing direction of the polarized light provided by the polarized light module 501 is the same to the direction of the polarizing film 502c, and if the controllable polarized light rotation liquid crystal unit 502a is switched to the non-polarized rotation state, the polarized light can pass there through with its original polarization, and after the polarized light passes through the micro phase retardation unit 502b, the polarizing film 502c and the transmissive display unit 504, the 3D image effect is presented as described above.

Referring to FIG. 26, when the polarizing direction of the polarized light module 501 is opposite to the direction of the polarizing film 502c, and if the controllable polarized light rotation liquid crystal unit 502a is switched to the non-polarized rotation state, the polarized light can pass there through with its original polarization, so that the 3D image effect is presented as described above.

Referring to FIG. 27, when the 2D planar image effect is about to be displayed, the same polarized light generated by the polarized light module 501 enters the polarized light barrier grating unit 502. Now, by switching the controllable polarized light rotation liquid crystal unit 502a to the polarized rotate state, the optical axis of the polarized light is rotated for 45 degrees or the polarized light is directly converted to the circular polarized light. Under function of the micro phase retardation unit 502b, the linear polarized light 505, the elliptical polarized light 506 or the circular polarized light 507 formed via rotation does not have the effective optical function. For the polarization state of the light, just a polarizing rotation direction of the light is reversed, so that the polarized light barrier grating unit 502 does not form the parallax gratings. Next, the polarizing film 502c allows the single polarized light to pass there through, and after passing through the transmissive display unit 504, the single polarized light enters the eyes of the observer, so that the observer can observe the planar image effect.

Figure 28:
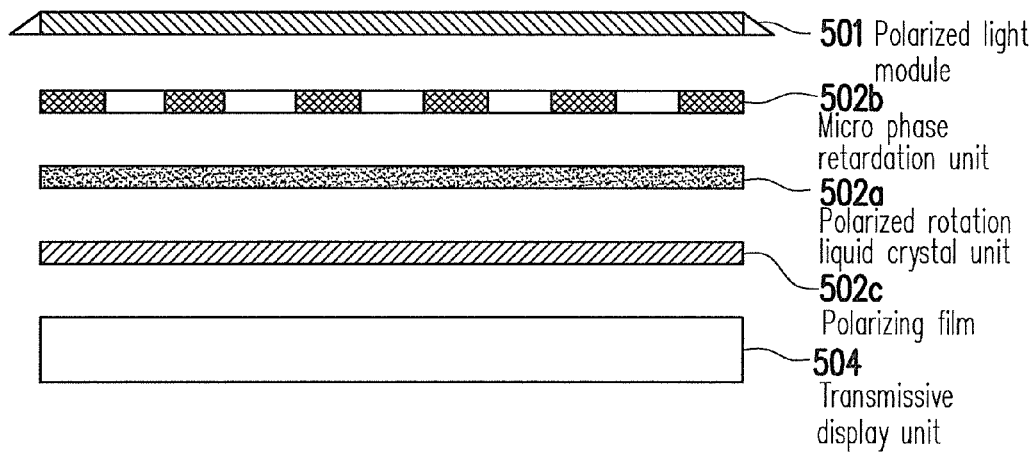
FIGS. 28-29 are cross-sectional views of a three-dimensional image display device having a 2D/3D switching function according to other exemplary embodiments.
Figure 29:
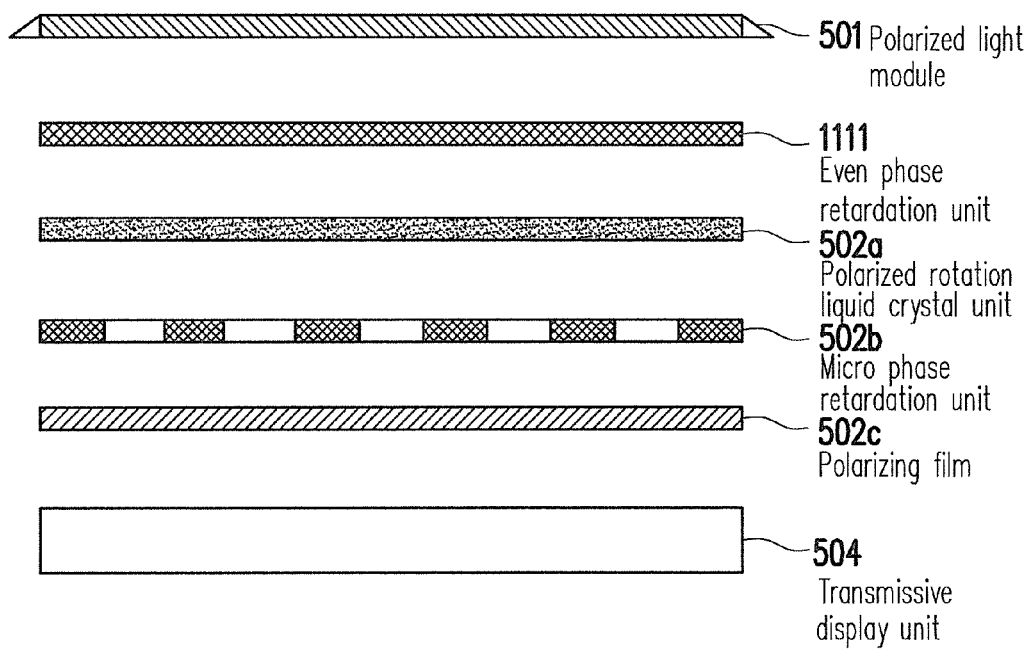

FIGS. 28-29 are cross-sectional views of a three-dimensional image display device having the 2D/3D switching function according to other exemplary embodiments. Referring to FIG. 28, in the polarized light barrier grating unit, positions of the polarized light rotation liquid crystal unit 502a and the micro phase retardation unit 502b can be exchanged, by which the 2D/3D image display can also be achieved. Referring to FIG. 29, an even phase retardation unit 1111 can be applied to such system structure, by which functions of the 2D/3D switching, disposing with 90 degrees rotation and display of two or more images can also be achieved. The even phase retardation unit 1111 can be, for example, disposed between the polarized light module 501 and the polarizing film 502c according to actual requirements.

According to the three-dimensional image display device having the 2D/3D switching function of the present disclosure, display angles of the three-dimensional image display device are diversified, in which at least the horizontal and the vertical display angles are ensured.

It will be apparent to those skilled in the art that various modifications and variations can be made to the structure of the present disclosure without departing from the scope or spirit of the invention. In view of the foregoing, it is intended that the embodiments described be considered as exemplary only, with the true scope of the embodiments being indicated by the following claims and their equivalents.

What is claimed is:

1. A three-dimensional image display device, comprising:
a polarized light module, for outputting a polarized light;
a non-vertical polarized light barrier grating unit, disposed in a light path of the polarized light to modulate the polarized light into a modulated polarized light in interlaced lines for outputting, wherein the non-vertical polarized light barrier grating unit comprises:
a micro phase retardation unit, having a non-vertical first phase modulation material and a second phase modulation material disposed in interlace, for respectively modulating a phase of the polarized light to output a plurality of modulated light;

a polarizing film, for receiving the modulated light from the micro phase retardation unit to output the modulated polarized light; and an even phase retardation unit, having an optical axis direction substantially perpendicular to an optical axis direction of the micro phase retardation unit, and disposed between the polarized light module and the polarizing film; and an image display unit, for receiving the modulated polarized light from the non-vertical polarized light barrier grating unit, so as to output two or more images with parallax.

2. The three-dimensional image display device as claimed claim 1, wherein the first phase modulation material and the second phase modulation material of the micro phase retardation unit are stripe-type structures not perpendicular to a horizontal axis direction.

3. The three-dimensional image display device as claimed claim 1, wherein widths of the first phase modulation material and the second phase modulation material are different.

4. The three-dimensional image display device as claimed claim 1, wherein in coordination with a pixel arrangement of the image display unit, the three-dimensional image display device is capable of being arbitrarily disposed in a plurality of angles for displaying a three-dimensional image, wherein the angles are rotation angles along a center normal line of the image display unit.

5. A dual-mode image display device, comprising:
a polarized light module, for providing a polarized light;
a display unit, for displaying a 2D or a 3D image; and
a non-vertical polarized light barrier grating unit, disposed between the polarized light module and the display unit, comprising a control device, which is used for providing a first state corresponding to the 3D image or a second state corresponding to the 2D image under control, wherein the non-vertical polarized light barrier grating unit further comprises:

a non-vertical micro phase retardation unit, having a first region and a second region, wherein the control device in the first state controls the first region and the second region to form a polarized light barrier parallax grating, and the control device in the second state controls the first region and the second region to not form the polarized light barrier parallax grating; and an even phase retardation unit, having an optical axis direction substantially perpendicular to an optical axis direction of the non-vertical micro phase retardation unit, and disposed at a same side of the polarized light module and the non-vertical micro phase retardation unit.

6. The dual-mode image display device as claimed in claim 5, wherein the polarized light module is a whole structure, and the polarized light is obtained via a polarizing film.

7. The dual-mode image display device as claimed in claim 5, wherein the non-vertical polarized light barrier grating unit has a polarizing film at a side facing the display unit.

8. The dual-mode image display device as claimed in claim 5, wherein the control device is a polarized rotation liquid crystal plate.

9. The dual-mode image display device as claimed in claim 5, wherein the control device is a scattering liquid crystal plate.

10. The dual-mode image display device as claimed in claim 5, wherein the first region and the second region of the non-vertical micro phase retardation unit have a half-wave-form ($\lambda/2$) retardation difference, so that polarization states of the two regions are mutually perpendicular.

11. The dual-mode image display device as claimed in claim 5, wherein the non-vertical micro phase retardation unit is located between the control device and the polarized light module.

12. The dual-mode image display device as claimed in claim 5, wherein the control device is located between the non-vertical micro phase retardation unit and the polarized light module.

13. The dual-mode image display device as claimed in claim 5, wherein stripe-type structures of the first region and the second region of the non-vertical micro phase retardation unit are not perpendicular to a horizontal direction.

14. The dual-mode image display device as claimed in claim 5 further comprising an image display unit, and in coordination with a pixel arrangement of the image display unit, the three-dimensional image display device is capable of being arbitrarily disposed in a plurality of angles for displaying a three-dimensional image.

15. A dual-mode image display device, comprising:
a polarized light module, for providing a polarized light source;
an even phase retardation unit, having a first optical axis direction and a first phase retardation amount;
a control device, having a first state or a second state according to a controlled modulation condition;
a non-vertical micro phase retardation unit, having a first region and a second region, wherein when the control device is in the first state, the first region and the second region form a polarized light barrier parallax grating, and when the control device is in the second state, the first region and the second region do not form the polarized light barrier parallax grating, wherein the optical axis direction of the even phase retardation unit is vertical to an optical axis direction of one of the two regions; and
a display unit, for displays a 2D or 3D image,
wherein the even phase retardation unit, the control device and the micro phase retardation unit are disposed between the polarized light module and the display unit.

16. The dual-mode image display device as claimed in claim 15, wherein the first region and the second region of the micro phase retardation unit have a $\lambda/2$ retardation difference, so that polarization states of the two regions are mutually perpendicular.

17. The dual-mode image display device as claimed in claim 15, wherein stripe-type structures of the first region and the second region of the micro phase retardation unit are not perpendicular to a horizontal direction.

18. The dual-mode image display device as claimed in claim 15, wherein the grating unit has a polarizing film at a side facing the display unit.

19. The dual-mode image display device as claimed in claim 15, wherein the control device is a polarized rotation liquid crystal plate.

20. The dual-mode image display device as claimed in claim 19, wherein the polarized rotation liquid crystal plate is capable of being regionally controlled.

21. The dual-mode image display device as claimed in claim 15, wherein the control device is a scattering liquid crystal plate.

22. The dual-mode image display device as claimed in claim 21, wherein the scattering liquid crystal plate is capable of being regionally controlled.

23. The dual-mode image display device as claimed in claim 15, wherein one of the two regions of the micro phase retardation unit does not generate a retardation, and another one of the two regions generates a λ/2 retardation.

24. The dual-mode image display device as claimed in claim 15, wherein the dual-mode image display device is capable of being arbitrarily disposed in a plurality of angles in coordination with a pixel arrangement of the image display unit, so as to display a three-dimensional image.

* * * * *